United States Patent [19]

Kohara et al.

[11] Patent Number: 5,374,219
[45] Date of Patent: Dec. 20, 1994

[54] OUTER RING FOR VIBRATION PROOF TYPE HOMOKINETIC JOINT

[75] Inventors: Takeshi Kohara; Katsumi Furutani; Takashi Nozaki; Isao Mikuriya, all of Iwata, Japan

[73] Assignee: NTN Corporation, Osaka, Japan

[21] Appl. No.: 158,487

[22] Filed: Nov. 29, 1993

Related U.S. Application Data

[63] Continuation of Ser. No. 817,197, Jan. 6, 1992, abandoned.

Foreign Application Priority Data

May 31, 1991 [JP] Japan ................. 3-129668
Jun. 28, 1991 [JP] Japan ................. 3-158378

[51] Int. Cl.⁵ ........................................ F16D 3/205
[52] U.S. Cl. ............................ 464/111; 464/83; 464/160; 464/170
[58] Field of Search .............. 464/83, 85, 89, 111, 464/170, 180, 905, 906, 160

[56] References Cited

U.S. PATENT DOCUMENTS

| | | | |
|---|---|---|---|
| 3,817,057 | 6/1974 | Orain | 464/89 |
| 4,405,032 | 9/1983 | Welschof et al. | 464/89 |
| 4,507,100 | 3/1985 | Doré et al. | 464/111 |
| 4,551,115 | 11/1985 | Ferguson | 464/83 |
| 4,734,079 | 3/1988 | Viets | 464/17 |
| 4,772,245 | 9/1988 | Readman et al. | 464/160 |

FOREIGN PATENT DOCUMENTS

| | | | |
|---|---|---|---|
| 1268917 | 6/1961 | France | 464/111 |
| 1224525 | 9/1989 | Japan | 464/111 |

Primary Examiner—Daniel P. Stodola
Assistant Examiner—Eileen A. Dunn
Attorney, Agent, or Firm—Nikaido, Marmelstein, Murray & Oram

[57] ABSTRACT

An outer ring for a vibration proof homokinetic joint has inner and outer casings. Vibration proof members made of an elastic material are disposed between the inner and outer casings. The outer casing is formed on an inner peripheral surface thereof with protrusions angularly spaced therebetween. The inner casing is formed on an outer pripheral surface thereof with grooves angularly spaced therebetween to receive the protrusions therein with predetermined gaps formed therebetween and extending in the direction of rotation of the joint. The vibration proof members are mounted between the adjacent protrusions and between the inner peripheral surface of the outer casing and the outer peripheral surface of the inner casing.

15 Claims, 9 Drawing Sheets

OUTER RING FOR VIBRATION PROOF TYPE HOMOKINETIC JOINT

This application is a continuation of application Ser. No. 07/817,197, filed Jan. 6, 1992, now abandoned.

This invention relates to an outer ring for use in a vibration proof type homokinetic joint.

Figure 22:
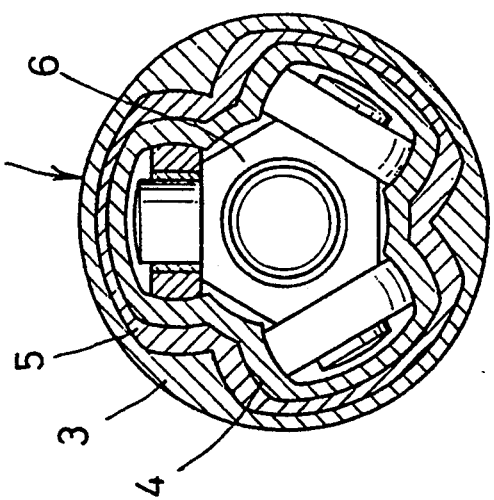
Figure 21:
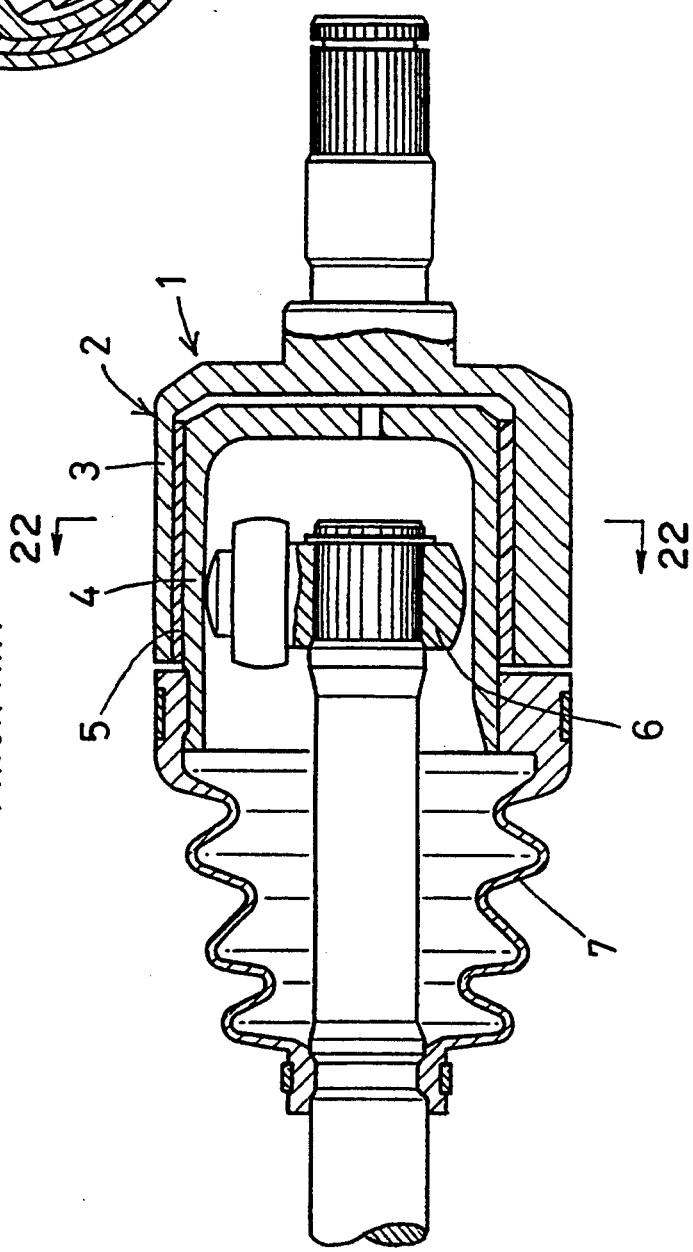

In order to solve the problem of vibration of an automobile originating from its driving mechanism, as shown in FIGS. 21 and 22, it is known e.g. from Japanese Unexamined Utility Model Publication No. 1-115021 to interpose a vibration proof member 5 between an outer casing 3 and an inner case 4 which together forms a casing 2 of an outer ring 1 for a homokinetic joint.

In the figures, numeral 5 designates a tripod member and 7 does a boot.

The vibration proof member 5, which is made of an elastic member such as rubber, serves to absorb vibrations transmitted through the homokinetic joint.

But if an excessive torque is applied, the outer casing 3 and the inner casing 4 might displace relative to each other in the direction of rotation. This may deform the vibration proof member 5 excessively and damage it. Also, such an excessive torque may exert both a compression stress and a shearing stress on the vibration proof member simultaneously, thus accelerating the damage to it.

It is a first object of this invention to restrict the relative displacement between the outer casing and the inner casing in the direction of rotation to below a predetermined level and to limit the torque load acting on the vibration proof member to a pure shearing load and thus to improve its durability.

Also, since in the above-mentioned prior art outer ring 1 the outer casing 3 and the inner casing 4 are coupled together simply by press-fitting, degradation with time of the vibration proof member 5 can cause the coming-out of the inner casing 4.

It is a second object of this invention to prevent the inner casing from coming out.

One of the effective means for achieving the first object is to employ a structure comprising an outer casing provided on the inner peripheral surface thereof with a plurality of axial protrusions, an inner casing provided the outer peripheral surface thereof with grooves adapted to receive the protrusions, and vibration proof members disposed between the inner peripheral surface of the outer casing and the outer peripheral surface of the inner casing. In this case, the vibration proof members are bonded to the outer surface of the inner casing and thin steel plates are bonded to the outer surface of the vibration proof member. The inner casing is then press-fitted into the outer casing.

But this type of outer ring for a homokinetic joint has a problem in that the radial dimension of the outer ring is rather large in order to prevent the tripod member inserted therein from abutting the protrusions on the outer casing. The steel plates interposed are another cause of the large radial dimension.

It is therefore a third object of this invention to provide an outer ring for a vibration proof homokinetic joint whose outer dimension is about as small as the outer ring of an ordinary non-vibration-proof homokinetic joint.

One effective means for achieving the third object is to employ, in place of the protrusions that are long in the axial direction, shorter protrusions provided on the outer casing at a location deeper than the tripod member inserted in the outer ring reaches. With this arrangement, the inner peripheral surface of the outer casing can be formed into a cylindrical surface except its deep area where the protrusions are formed. Thus, no obstacle is present between the outer casing and the inner casing inserted therein, so that a die can be inserted therebetween freely to cast a vulcanizate and form it into vibration proof members having a predetermined shape and couple the outer casing and the inner casing together. This arrangement eliminates the use of steel plates bonded to the outer surfaces of the vibration proof members.

But, this structure has a problem in that the vibration proof members deform at different rates along the longitudinal direction if an excessive torque acts because the outer casing and the inner casing abut with each other only at portions deep inside. This may cause either the outer casing or the inner casing to make a nutation or a pivoting motion. In order to prevent this, the vibration proof members have to have an increased rigidity. This will greatly limit the adjustable range of rigidity of the vibration proof members and thus make it difficult to reduce vibration to an optimum level.

It is therefore a fourth object of this invention to provide an outer ring for a vibration proof homokinetic joint which is Free of grinding movement without increasing the rigidity of the vibration proof members.

In accordance with the present invention, as the means for achieving the first object, there is provided an outer ring for a vibration proof homokinetic joint, the outer ring having a casing comprising an outer casing and an inner casing and vibration proof members made of an elastic material and disposed between the outer casing and the inner casing, characterized in that the outer casing is formed on an inner peripheral surface thereof with protrusions angularly spaced therebetween, and the inner casing is formed on an outer peripheral surface thereof with grooves angularly spaced therebetween to receive the protrusions therein with predetermined gaps formed therebetween and extending in the direction of rotation of the joint, and in that the vibration proof members are mounted between the adjacent protrusions and between the inner peripheral surface of the outer casing and the outer peripheral surface of the inner casing.

Also, thin plate members may be provided on the inner peripheral surface of the outer casing between the adjacent protrusions, and vibration proof members may be bonded to the inner side of the thin plate members.

Each of the gaps formed between each protrusion and tile wall faces of the each groove should have a central angle which is equal to or smaller than a central angle of a distance between each protrusion and the end of each vibration proof member.

As the means for achieving the second object, the outer casing has both ends thereof open and has its inner peripheral surface opposite to the vibration proof member formed as a tapered surface so that the outer casing will have an inner diameter increasing gradually toward the bottom of the joint.

Figure 1:
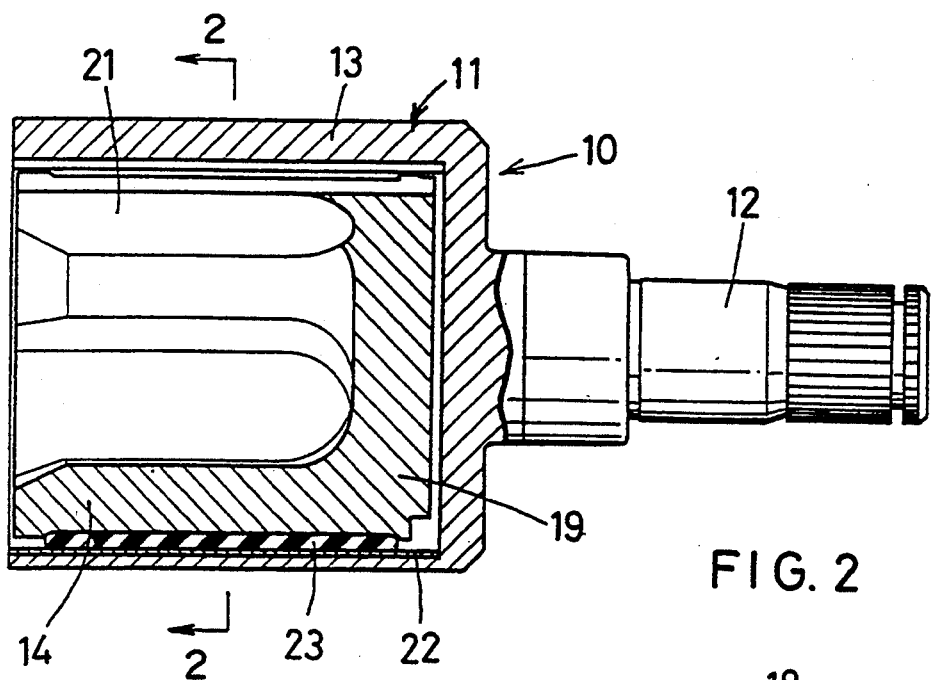
Figure 2:
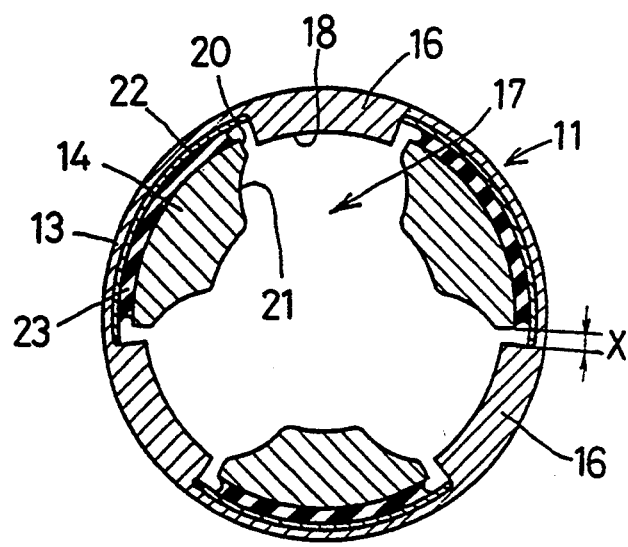
Figure 3:
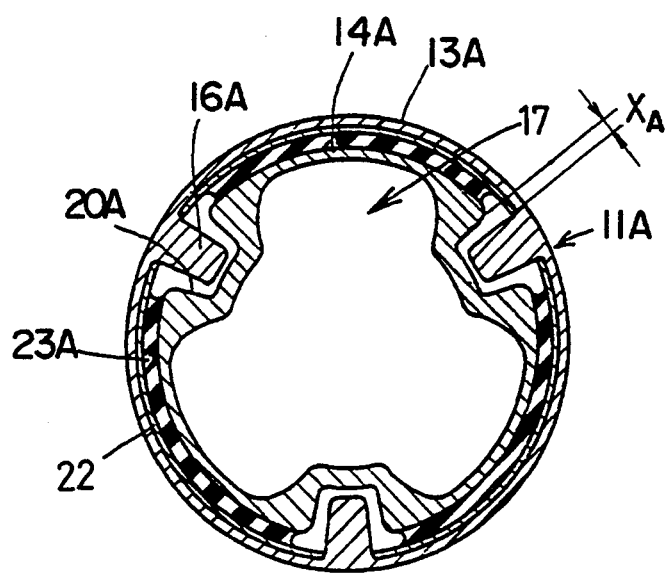
Figure 4:
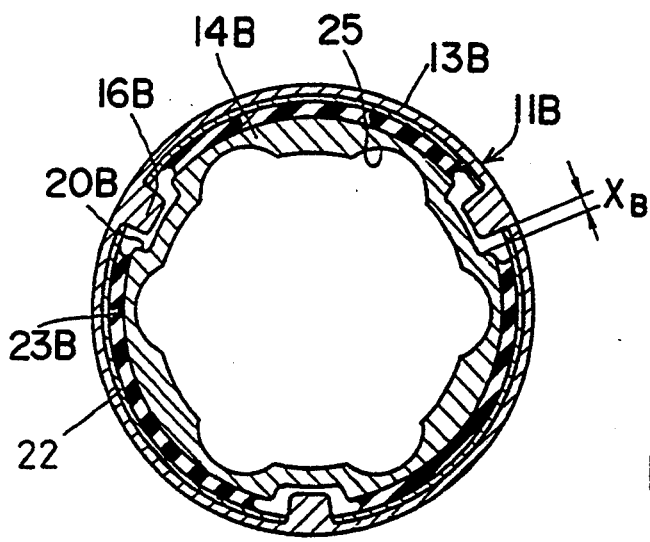
Figure 5:
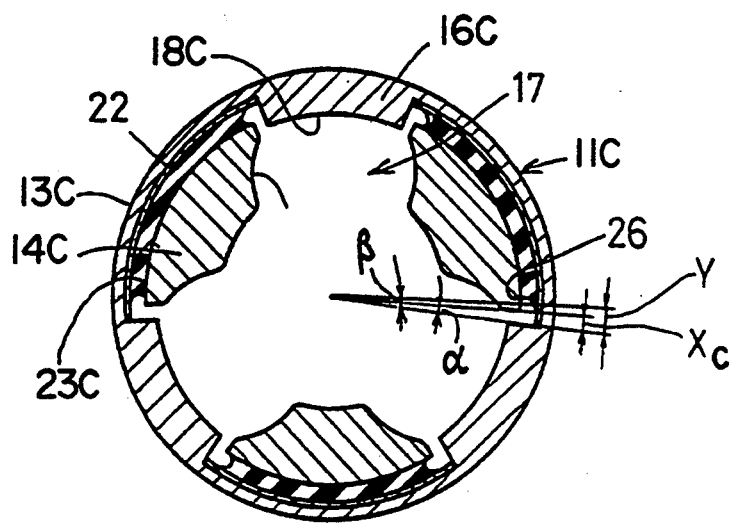
Figure 6:
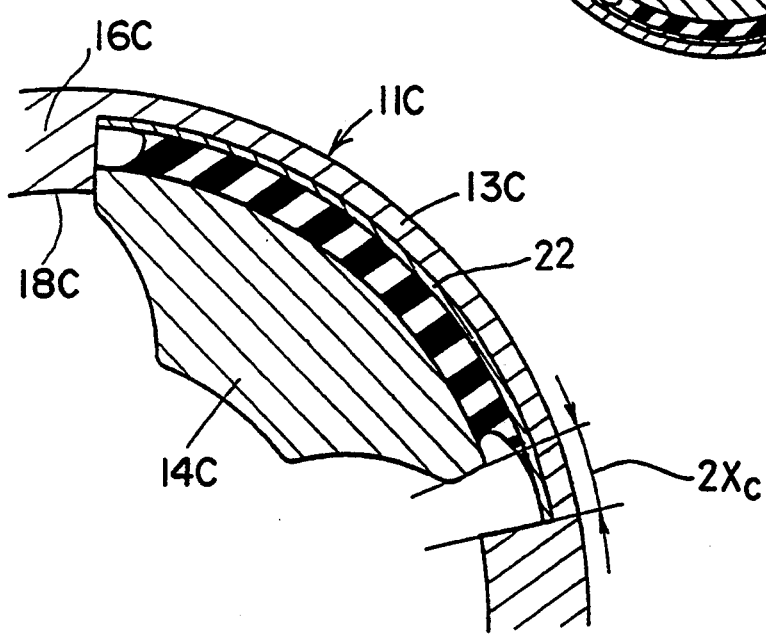
Figure 7:
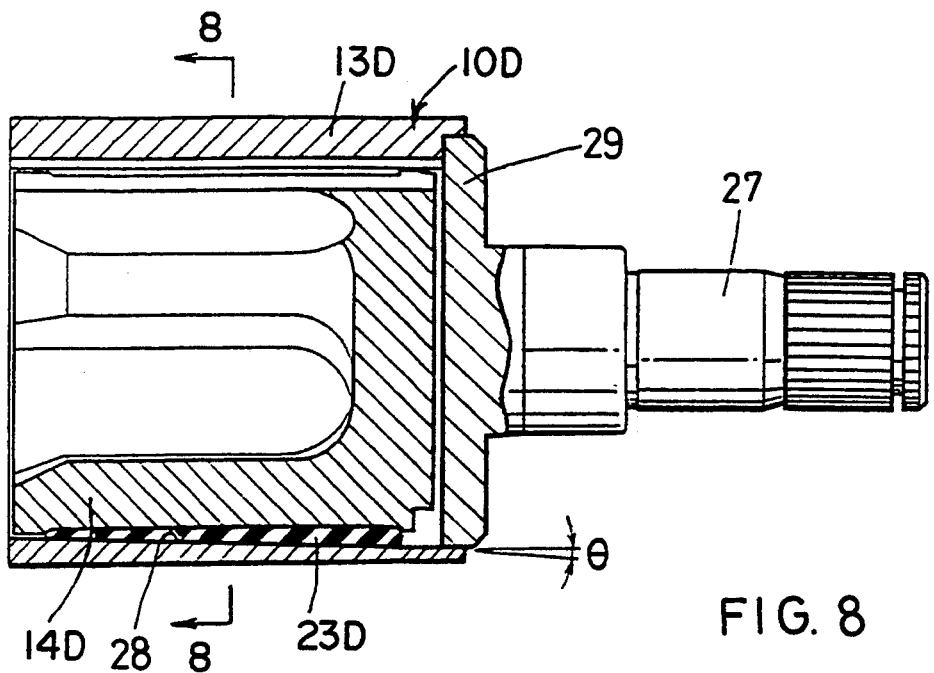
Figure 8:
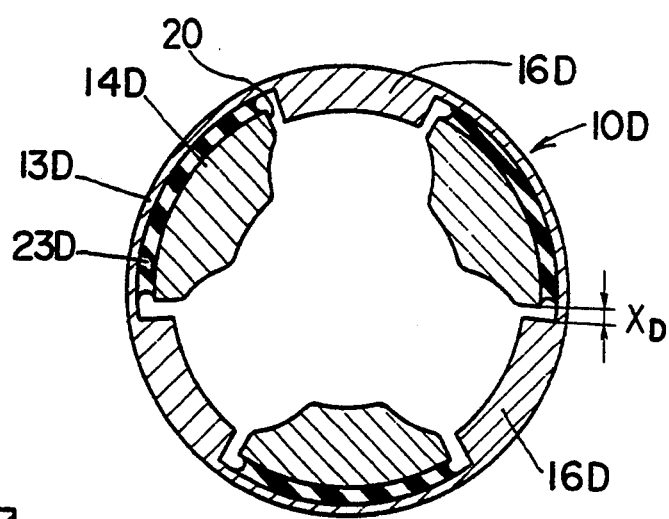
Figure 9:
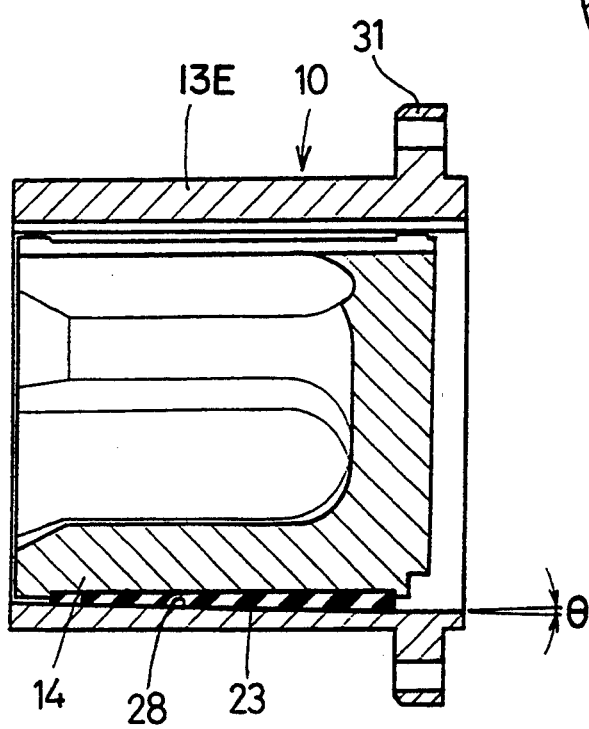
Figure 10:
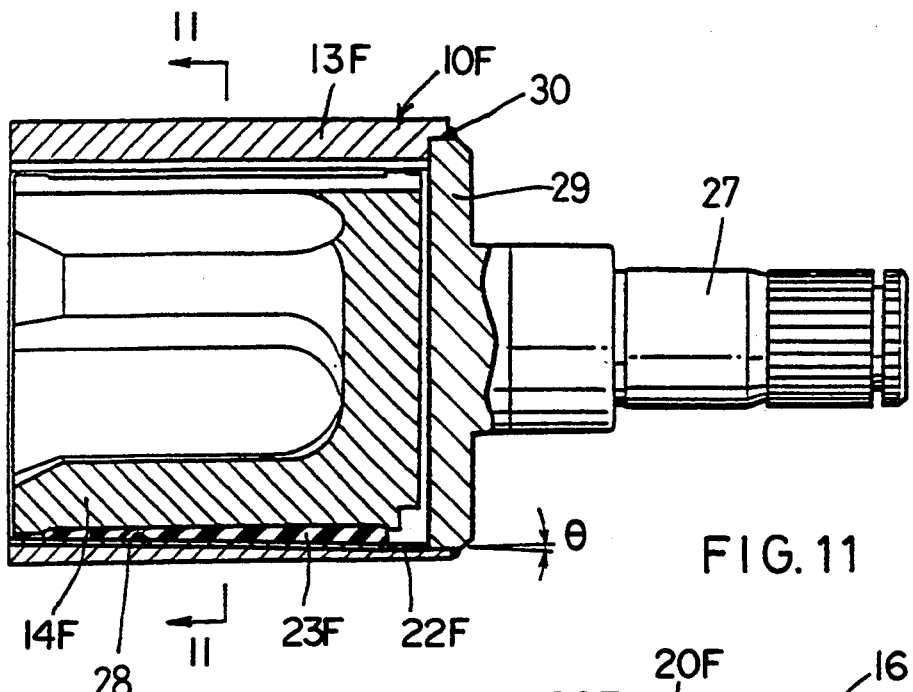
Figure 11:
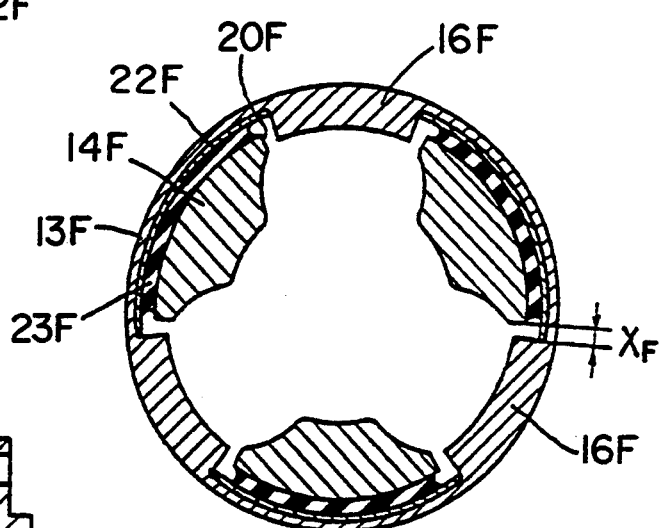
Figure 12:
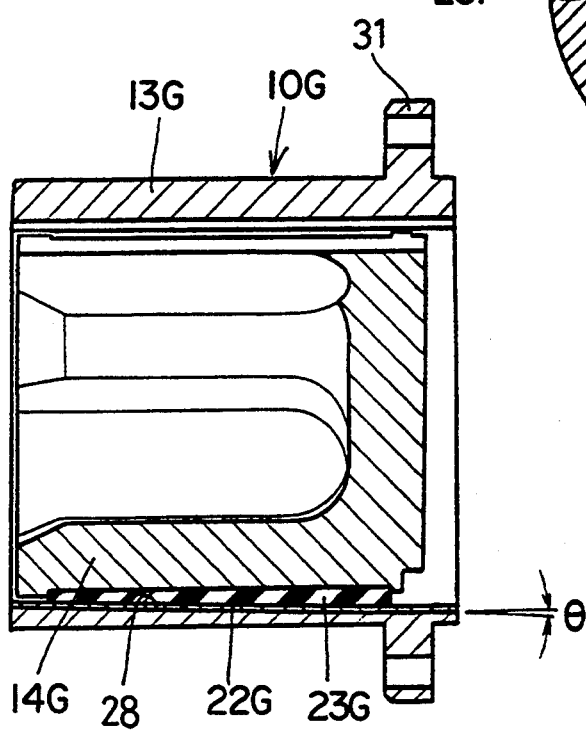
Figure 14:
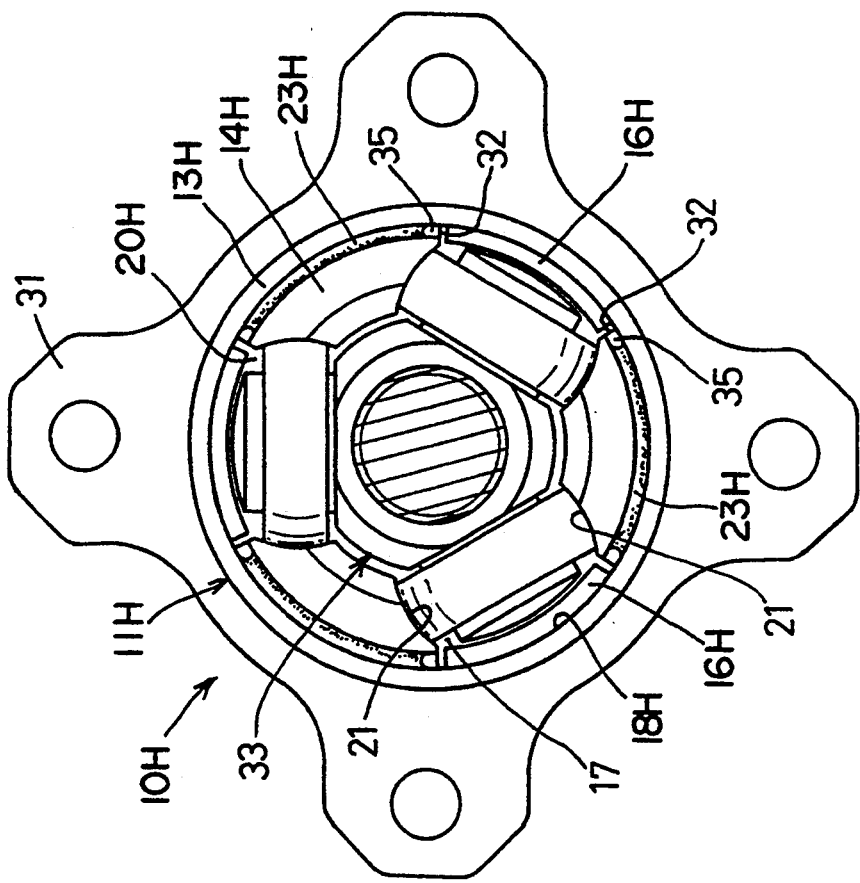
Figure 13:
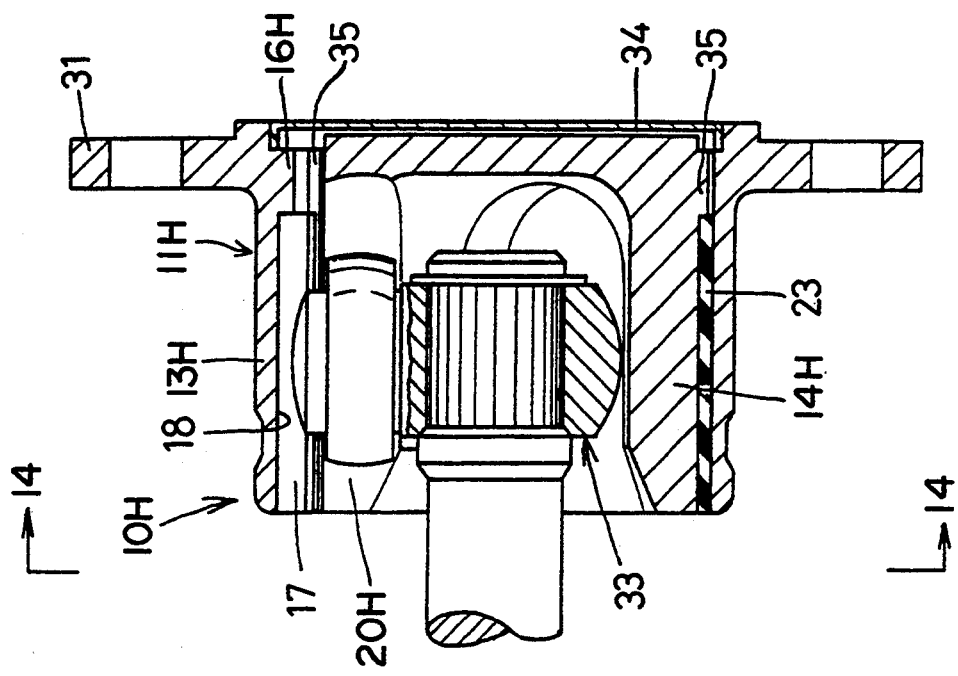
Figure 16:
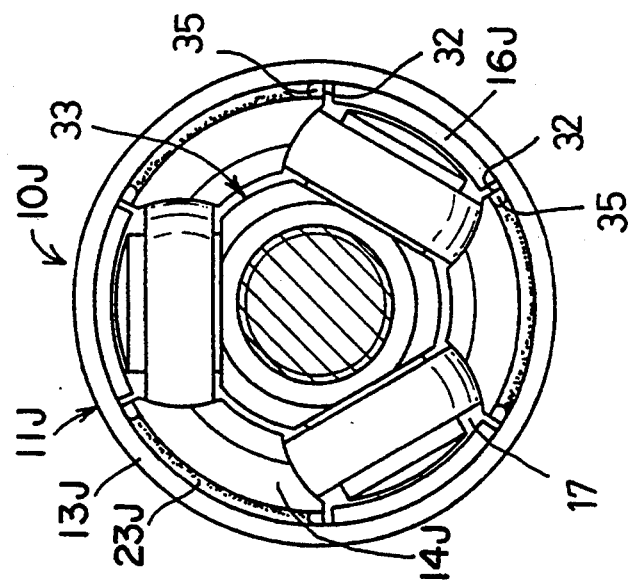
Figure 15:
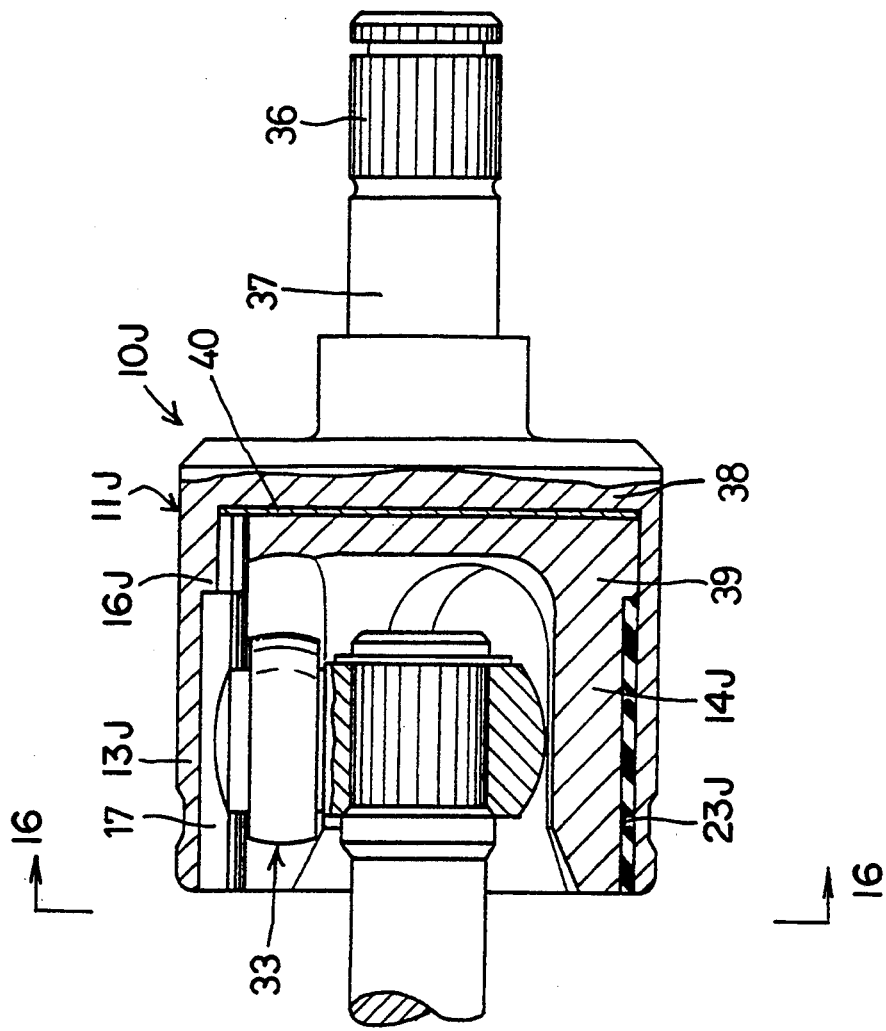
Figure 17:
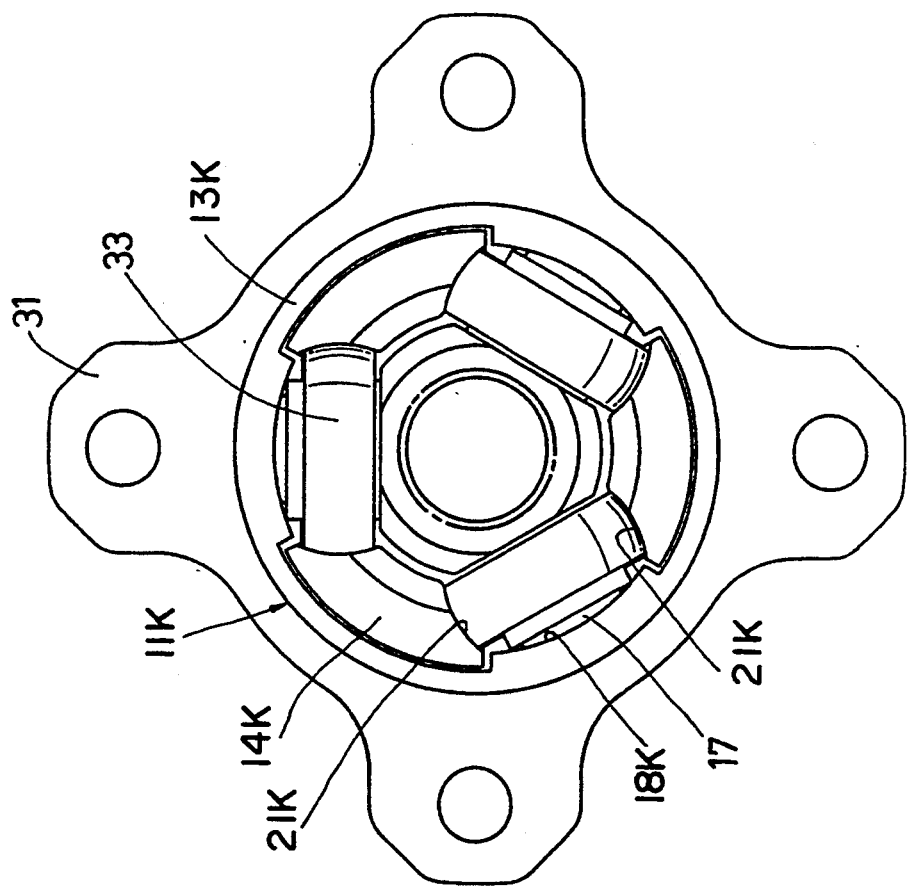
Figure 18:
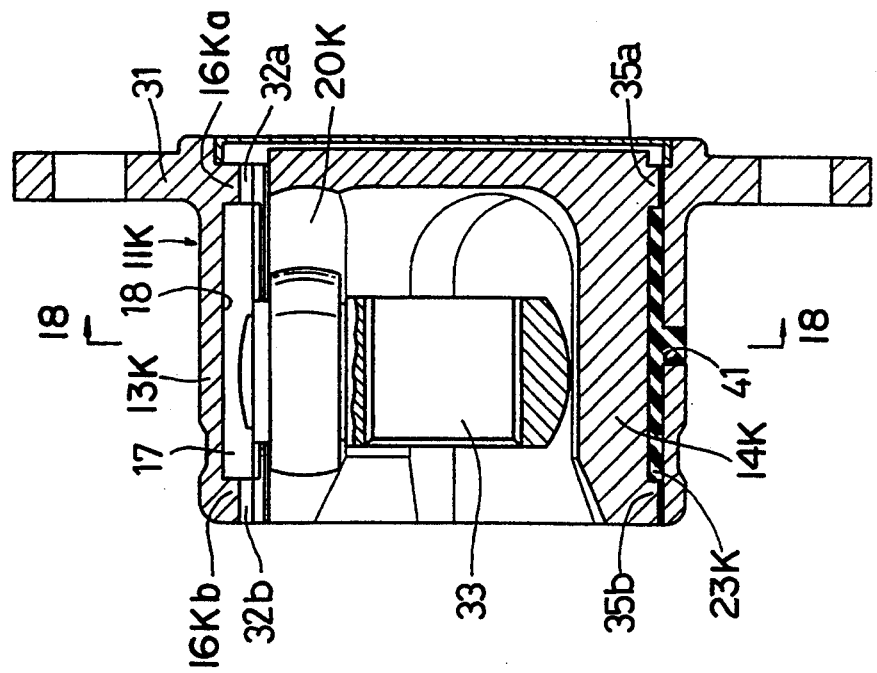
Figure 19:
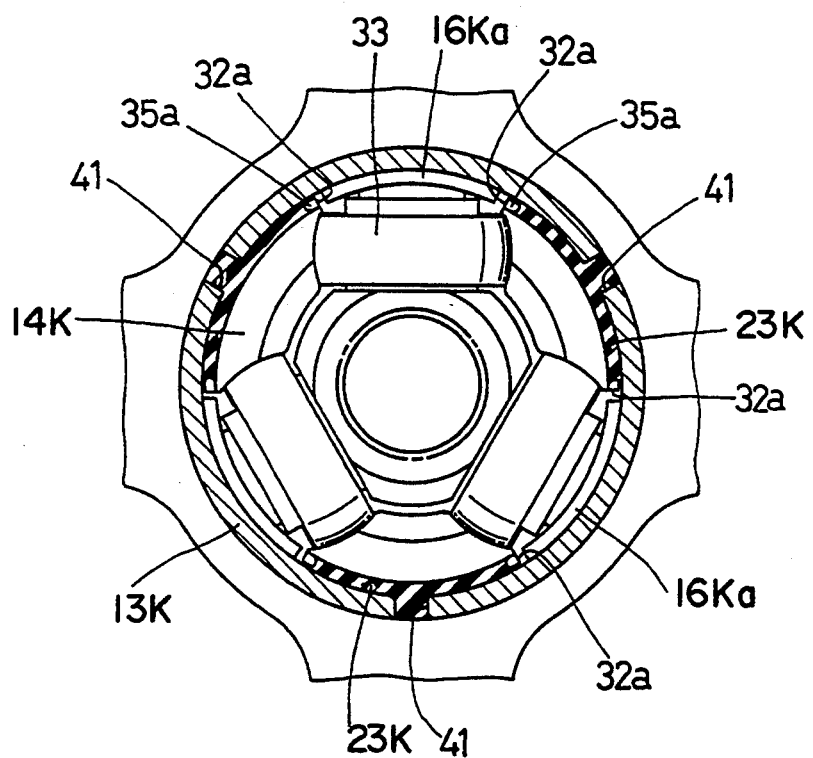
Figure 20:
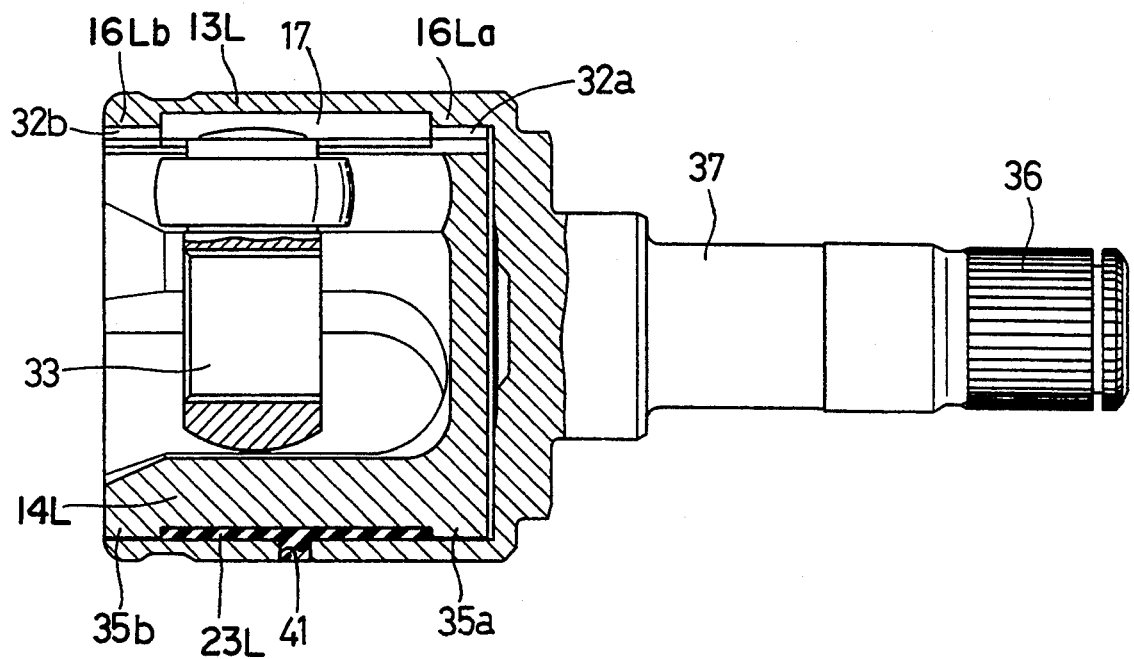

As the means for achieving the third object, the protrusions are provided only near one end of the outer casing. As the means for achieving the fourth object, the protrusions are provided at both ends of the outer casing and the outer casing is formed with a radial hole between the protrusions for injecting a material for the vibration proof member. Other features and objects off the present invention will become apparent from the following description taken with reference to the accompanying drawings, in which:

FIG. 1 is a sectional view of a first embodiment;
FIG. 2 is a sectional view taken along line A—A of FIG. 1;
FIG. 3 is a sectional view of a second embodiment;
FIG. 4 is a sectional view of a third embodiment;
FIG. 5 is a sectional view of a fourth embodiment;
FIG. 6 is a partial enlarged sectional view of the same showing the state displaced from the position of FIG. 5;
FIG. 7 is a sectional view of a fifth embodiment;
FIG. 8 is a sectional view taken along line C—C of FIG. 7;
FIG. 9 is a sectional view of a sixth embodiment;
FIG. 10 is a sectional view of a seventh embodiment;
FIG. 11 is a sectional view taken along line D—D of FIG. 10;
FIG. 12 is a sectional view of an eighth embodiment;
FIG. 13 is a vertical sectional side view of a ninth embodiment;
FIG. 14 is a sectional view taken along line E—E of FIG. 13;
FIG. 15 is a vertical sectional side view of a tenth embodiment;
FIG. 16 is a sectional view taken along line F—F of FIG. 15;
FIG. 17 is a vertical sectional front view of an 11th embodiment;
FIG. 18 is a side view of
FIG. 17;
FIG. 19 is a sectional view taken along line G-G of FIG. 17;
FIG. 20 is a partially sectional front view of a 12th embodiment;
FIG. 21 is a sectional view of a prior example; and
FIG. 22 is a sectional view taken along line H—H of FIG. 21.

FIRST EMBODIMENT

FIGS. 1 and 2 show the first embodiment in which an outer ring 10 for a homokinetic joint comprises an outer casing 11 and a shank 12. The casing 11 comprises an outer casing 13 having a bottom-closed cup shape and integral with the shank 12 and an inner casing 14 mounted in the outer casing 13.

The outer casing 13 is formed on the inner peripheral surface thereof with three circumferentially equidistant protrusions 16, which are located at such positions as to form bottoms 18 of track grooves 17.

The inner casing 14 has a closing wall 19 opposite to the bottom surface of the outer casing 13 and is formed with three grooves 20 spaced apart from one another at equal circumferential intervals and extending from the peripheral edge of the closing wall 19 to an open end to receive the protrusions 16. The grooves 20 are slightly wider than the protrusions 16, so that both sides of each groove will face the side faces of the protrusions 15 with gaps X defined therebetween. Track groove wall surfaces 21 having an arcuate section are formed at the inner peripheral side of the grooves 20, defining the track grooves 17 in cooperation with the groove bottoms 18 (
FIG. 5).

A thin plate member 22 made of steel and a vibration proof member 23 made of a resilient material such as rubber are disposed between each of three outer peripheral faces of the inner casing 14 divided by the grooves 20 and each of the three inner peripheral faces of the outer casing divided by the protrusions 16. The thin plate members 22 are inserted along the inner periphery of the outer casing 13 so that their both sides will abut the protrusions 16. The thin plate members 22, the vibration proof members 23 and the outer peripheral surface of the inner casing 14 are bonded together.

A tripod member is inserted into three track grooves 17 to form a homokinetic joint. When the outer casing and the inner casing 14 displace relative to each other above a predetermined distance in the direction of rotation of the homokinetic joint by the torque applied to the joint, the gaps X will become zero so that the protrusions 16 and the side walls of the grooves 20 will abut and interfere with each other, thus preventing any further relative displacement. This prevents any abnormal deformation of the vibration proof members 23. The thin plate members 22 serve t;o prevent slipping between the outer casing 13 and the vibration proof members 23.

Second Embodiment

FIG. 3 shows the second embodiment in which the outer casing 13A and the inner casing 14A are both in the shape of a bottom-closed cup. The protrusions 16A formed on the inner peripheral surface of the outer casing 13A are narrower than those in the first embodiment, so that the inner peripheral faces defined by the protrusions 16A are accordingly wider.

The inner casing 14A is formed in the outer peripheral surface thereof with grooves 20A provided opposite to the protrusions 16A with small circumferential gaps $X_A$ defined therebetween. The inner casing 14A has its outer peripheral portions located between the grooves 20A inserted between the adjacent protrusions 16A. A thin plate member 22 and a vibration proof member 23A are disposed between the inner peripheral surface of the outer casing 13A and the outer peripheral surface of the inner casing 14A and bonded together in the; same manner as in the first embodiment. The thin plate members 22 have both sides thereof abutting the sides of the protrusions 16A.

In this embodiment, too, both sides of the protrusions 16A are located opposite to the side walls of the grooves 20A with small circumferential gaps $X_A$ left therebetween, so that when a torque greater than a predetermined value acts the side walls off the grooves 20A and the protrusions 16A abut at their opposed surfaces and interfere with each other to prevent the vibration proof members from being deformed abnormally.

In the second embodiment, the vibration proof members 23A have an increased volume compared with those in the first embodiment and thus have higher durability. Also the contact area between the protrusions 16A and the side walls of the grooves 20A increases, so that the vibration proof members 23A are prevented from being deformed abnormally.

Third Embodiment

The third embodiment shown in FIG. 4 is an outer ring for a double offset type homokinetic joint. A plurality of ball grooves 25 are formed in the inner peripheral surface of the inner casing 14B.

This embodiment is the same as the second embodiment in that the protrusions 16B and the grooves 20B are formed between tile outer casing 13B and the inner casing 14B, respectively, and in that the thin plate members 22 and the vibration proof members 23B are interposed between the outer peripheral surface of the outer casing 13B and the inner peripheral surface of the inner casing 14B. Also, its function is the same, too.

In any of tile first to third embodiments, the thin plate members 22 serve to position tile inner casing 14 relative to the outer casing 13. But they may be omitted with only the vibration proof members 23 to 23B disposed between the outer casing 13 anti the inner casing 14. This may make it difficult to position the inner casing 14 relative to the outer casing 13 but can at least fulfil the object of preventing abnormal deformation of the vibration proof members 23.

Fourth Embodiment

The fourth embodiment shown in FIG. 5 is basically similar to the first embodiment shown in FIG. 2. But in this case, a central angle $\alpha$ which corresponds to the $X_C$ between the protrusions 16C and the side walls of the grooves 20C and a central angle $\beta$ corresponding to the distance Y between the protrusions 16C and the end portions 26 of the vibration proof members 23C are set to satisfy the relation $\alpha \leq \beta$.

With this arrangement, even if the inner casing 14C and the outer casing 13C move relative to each other to a maximum degree so that the gaps $X_C$ at one side should become zero with the gaps at the other side growing to $2X_C$ as shown in FIG. 6, the vibration proof members 23C are covered by the inner casing 14C. This prevents the ends of the vibration proof members 23C from protruding into the gap $2X_C$ toward the inside of the joint.

Fifth Embodiment

An outer ring 10D of the fifth embodiment shown in FIGS. 7 and 8 comprises an outer casing 13D having both ends open, a stem 27 welded to the bottom of the outer casing 13D, an inner casing 14D and a vibration proof member 23D.

The outer casing 13 has its inner Peripheral surface formed into a tapered surface 28 having such an angle arranged at circumferentially equal intervals. The opposite inner peripheral surfaces of the protrusions 16D are formed into tapered surfaces 28 having such an angle that their diameter increases toward the bottom of the joint.

The inner casing 14D is formed with grooves 20D which received the protrusions 16D with predetermined gaps $X_D$ defined therebetween, the gaps extending in the direction of rotation of the joint. The tapered surface 28 of the outer casing 13D and the outer peripheral surface of the inner casing 14D are located opposite to each other with required gaps. The vibration proof member 23D is disposed between the opposite surfaces.

The vibration proof member 23D is bonded beforehand to the outer peripheral surface of the inner casing 14D.

As in the aforementioned embodiments, after press-fitting the inner casing 14D into the outer casing 13D, the stem 27 is welded at its closed portion 29 to the outer casing 13D.

The gaps $X_D$ in the fifth embodiment become zero if the inner casing 14D and the outer casing 13D rotate relative to each other in the direction of rotation of the joint, so that the protrusions 16D on the outer casing 13D will interfere with the side walls of grooves 20D of the inner casing 14D, thus preventing any further relative rotation.

Sixth Embodiment

In the sixth embodiment shown in
FIG. 9, instead of the stem 27 of the fifth embodiment, flanges 31 are provided on the outer peripheral surface of the outer casing 13E near its bottom.

Seventh Embodiment

The seventh embodiment shown in FIGS. 10 and 11 is basically similar to the fifth embodiment (FIGS. 7 and 8). But it differs in that thin metal plate members 22F having a width corresponding to the width of the tapered surfaces 28 between the protrusions 16F of the outer casing 13F are disposed between the protrusions 16F and in that vibration proof members 23F are Bonded to the thin plate members 22F. The inner casing 14F is press-fitted into the vibration proof member 23F.

Eighth Embodiment

In the eighth embodiment shown in
FIG. 12, instead of the stem 27 in the seventh embodiment, flanges 31 are provided on the outer peripheral surface of the outer casing 13G near its bottom.

Ninth Embodiment

FIGS. 13 and 14 show the 9th embodiment of this invention. An outer ring 10H of this embodiment is of a flange type used for a tripod type homokinetic joint. A casing 11H is integrally provided with flanges 31 on the outer periphery thereof near its end.

The casing 11H comprises an outer casing 13H having both end thereof opened and an inner casing 14H mounted in the outer casing 13H.

The outer casing 13H has a cylindrical inner peripheral surface which defines bottoms 18 of track grooves 17. The outer casing 13H is formed on the inner peripheral surface thereof at its end with three protrusions 16H arranged at circumferentially equal intervals. The protrusions 16H cooperate with abutting surfaces 32 formed on the outer periphery of the inner casing 14H to constitute a stopper means. They are provided only at or near the bottom of the outer casing 13H to which a lid frame 34 is mounted, so that they would not interfere with a tripod member 33 mounted inside.

The inner casing 14H is formed with three grooves 20H at equal circumferential spacings, which extend from the peripheral edge of the bottom to the open end of the casing 14H. The grooves 20H are provided on the inner surface thereof with walls 21 of track groove 17 having an arcuate section.

Further, ribs 35 are provided on the outer peripheral surface of the inner casing 14H at the end (bottom) thereof so as to be opposite to the protrusions 16H as stoppers. The ribs 35 are provided on the outer peripheral surfaces thereof with abutting surfaces 52 located opposite to the protrusions 16H with predetermined gaps therebetween in a circumferential direction.

The outer casing 13H and the inner casing 14H are mounted in one into the other and coupled together with a vibration proof material 23H disposed therebetween, the material being made of an elastic material such as rubber and bonded to both casings by vulcanization.

In this arrangement, since the protrusions 16H and the ribs 35 which constitute the interference mechanism are provided at the end of the outer ring 10H, the interference mechanism will never abut a die to be inserted into the outer casing 11H through its open end for vulcanization. This makes it possible to bond the vibration proof material 23H to the inner peripheral surface of the outer casing 13H and the outer peripheral surface of the inner casing 14 simultaneously by vulcanization. There is no need to interpose thin plate members therebetween by pushing them in.

Further, since the interference mechanism is not provided in the track groove 17, in which the tripod member 53 moves, the tripod member 33 will not abut the protrusions 16H Thus, the radial dimension of the outer ring can be reduced to the same level as that of an ordinary non-vibration-proof type homokinetic joint.

The tripod member 33 is inserted in the three track grooves 17 of the outer ring 10H for use as a homokinetic joint. If an excessive load acts on the joint, causing the outer casing 13H and the inner casing 14H to displace by more than a predetermined distance relative to each other in the direction of rotation of the joint, the protrusions 16H and the abutting surfaces 32 will abut and interfere with each other. In this state, any more relative displacement is restricted. Thus the vibration proof member 23H is prevented from being damaged. In this case, troubles which result from a large torque concentrating on tile ends of the casings 13H and 14H (such as pivotting movement of the inner casing 14H) can be prevented by increasing the rigidity of the vibration proof member 23H in the radial direction and by suitably setting the abutting angle of the interference members.

If the outer ring ms of a flange type having both ends open, since the die can be inserted into the outer ring through its bottom, too, the protrusions 16H and the abutting surfaces 32 may be provided at the open end of the outer ring.

Tenth Embodiment

FIGS. 15 and 16 show the 10th embodiment. An outer ring 10J of this embodiment is of a stem type in which the casing 11J is integrally provided with a shank 37 having a serration 36. The bottom 38 of tile outer casing 13J is formed integral with the shank 37.

The internal structure of the outer ring 10J is basically the same as that of the 9th embodiment. But, this embodiment is characterized in that a resilient film member 40 such as an elastomer sheet is disposed between the bottom 38 of the outer casing 13J and the bottom 39 of the inner casing 14J.

In case of a stem type outer ring, in order to simultaneously bond the outer casing 13J and the inner casing 14J by vulcanization with their bottoms 38 and 39 axially spaced apart by a predetermined distance from each other, it was necessary to axially position the inner casing 14J with a die for bonding. For this purpose, a die having a complicated structure was needed. In contrast, in this embodiment, since the resilient member 40 is disposed between the bottoms 38 and 39, no metal-to-metal contact occurs in positioning the casings 13J and 14J and thus they can be easily bonded together by vulcanization. Also, since no metal-to-metal contact occurs between the inner casing bottom 39 and the outer casing bottom 38, the bottoms are less likely to be worn and fretted.

Eleventh Embodiment

FIGS. 17 to 19 show the 11th embodiment. An outer ring for a joint of this embodiment is of a flange type for use in a tripod type homokinetic ,joint and thus comprises a casing 11K and the fixing flange 31 integrally formed on the outer peripheral surface of the casing at its end .

The casing 11K comprises an outer casing 13K having both ends opened and an inner casing 14K fitted in the outer casing 13K.

The outer casing 13K has a cylindrical inner peripheral surface defining the bottoms 18K of track grooves 17 and is formed on its inner peripheral surface at both ends thereof with three protrusions 16Ka and 16Kb arranged circumferentially at equal intervals. The protrusions 16Ka and 16Kb and abutting surfaces 32a, 32b formed on the inner casing 14 which are to be described later constitute an interference mechanism. They are provided only near the opening of the outer casing 13K so as not to interfere with a tripod member mounted inside. The outer casing 13K is formed between the protrusions 16Ka and 16Kb with radial through-holes 41 through which a vibration proof material is injected.

The inner casing 14K is formed with three grooves 20K circumferentially spaced apart from each other at equal intervals and extending from the peripheral edge of the bottom to the open and thereof. An arcuate track groove wall 21K is formed on either side of each groove 2OK. The track grooves 17 are formed by the walls 21K and the groove bottoms 18K.

The inner casing 14K is provided on the outer peripheral surface thereof at both its ends with ribs 35a and 35b corresponding to the protrusions 16Ka and 16Kb. The ribs 35a and 35b are formed on the sides thereof with abutting surfaces 32a and 32b so as to be opposite to the protrusions 16Ka and 16Kb with predetermined gaps left therebetween.

The outer casing 13K and the inner casing 14K are fitted together and fixed in a die. Then they are bonded simultaneously by injecting a vibration proof elastic material 13K such as rubber through the holes 41. This method of injecting a material radially from outside the outer casing 13K is less troublesome, can reduce the interference between the inner and outer casings and the die supporting them, and can simplify the structure of the die. Thus, workability improves and the production cost can be cut down compared with a conventional method in which a vibration proof member having a steel plate bonded thereto by vulcanization is press-fitted into the outer casing.

The outer ring is used as a homokinetic joint with the tripod member 33 inserted in the three track groove 17. If an excessive torque acts on the joint, the protrusions 16Ka and 16Kb abut tile abutting surfaces 32a and 32b, thus restricting the relative displacement of the vibration In this case, torque is transmitted through both ends of the outer casing 13K and the inner casing 14K, so that the vibration proof member 23K is prevented from skewing longitudinally and the inner casing 14K will make no pivotting movement. Thus, the rigidity of the vibration proof member 23K can be varied freely without impairing its durability. This in turn makes it possible to design the joint in such a way that it can attain the maximum vibration damping effect for various vehicles equipped with different driving power transmission mechanisms.

Since the interference mechanism is not provided in the track groove through which tile tripod member 33 moves, the internal dimensions are not limited. Thus, the diameter of the outer ring can be reduced to the same level as that of an outer ring for an ordinary non-vibration-proof homokinetic joint.

Twelveth Embodiment

FIG. 20 shows the 12th embodiment. In this embodiment, an outer casing 13L of an outer ring For a joint is integrally provided with a shank 37 having a serration 36. Since the outer casing 13L has the same structure as that of the 11th embodiment, it is denoted by the same numeral and its description is omitted.

What is claimed is:

1. An outer ring for a vibration proof homokinetic joint, said outer ring having a casing comprising an outer casing and an inner casing, and vibration proof members made of an elastic material and disposed between said outer casing and said inner casing, characterized in that said outer casing is formed with protrusions having side faces and angularly spaced along an inner peripheral surface thereof, and said inner casing is formed with grooves having side wall portions and angularly spaced along an outer peripheral surface thereof so as to receive said protrusions therebetween with predetermined gaps formed between side faces of said protrusions adjacent to side wall portions of said grooves, said grooves extending along the axis of rotation of the joint, and in that said vibration proof members are located between said adjacent protrusions and mounted between the inner peripheral surface of said outer casing and the outer peripheral surface of said inner casing.

2. An outer ring for a vibration proof homokinetic joint as claimed in claim 1, wherein thin plate members are provided on the inner peripheral surface of said outer casing between said adjacent protrusions, and wherein said vibration proof members are bonded to an inner side surface of said thin plate members relative to said outer casing.

3. An outer ring for a vibration proof homokinetic joint as claimed in claim 1 or 2, wherein each of said gaps formed between a side face of a protrusion and a corresponding side wall portion of a groove has a central angle which is equal to or smaller than a central angle of a distance between each said protrusion and the end of each said vibration proof member.

4. An outer ring for a vibration proof homokinetic joint as claimed in claim 1, wherein said outer casing has both ends thereof open and has its inner peripheral surface opposite to said vibration proof member formed as a tapered surface so that said outer casing will have an inner diameter increasing gradually toward a bottom of the joint relative to the axis of rotation.

5. An outer ring for a vibration proof homokinetic joint as claimed in claim 1, wherein said protrusions are provided only near a bottom end of said outer casing.

6. An outer ring for a vibration proof homokinetic joint as claimed in claim 5, wherein a resilient member in the form of a thin film is provided between a bottom inner surface of said outer casing and a bottom inner surface of said inner casing relative to the axis of rotation to separate them.

7. An outer ring for a vibration proof homokinetic joint as claimed in claim 1, wherein said protrusions are provided at opposite ends of said outer casing and said outer casing is formed with a radial hole between said protrusions for injecting a material for said vibration proof member.

8. An outer ring for a vibration proof homokinetic joint, said outer ring comprising:

an outer casing formed with protrusions having side faces and angularly spaced along an inner peripheral surface thereof;

an inner casing formed with grooves having side wall portions and angularly spaced along an outer peripheral surface thereof so as to receive the protrusions of said outer casing therebetween with predetermined gaps formed between side faces of the protrusions adjacent to side wall portions of the grooves, the grooves extending along the axis of rotation of the joint; and a plurality of vibration proof members made of an elastic material and disposed between said outer casing and said inner casing, each of said vibration proof members being located between the adjacent protrusions and mounted between the inner peripheral surface of said outer casing and the outer peripheral surface of said inner casing.

9. An outer ring for a vibration proof homokinetic joint as claimed in claim 8, further comprising:

a plurality of thin plate members provided on the inner peripheral surface of said outer casing between the adjacent protrusions, wherein each of said vibration proof members is bonded to an inner side surface of a corresponding thin plate member relative to said outer casing.

10. An outer ring for a vibration proof homokinetic joint as claimed in claim 8, wherein each of the gaps formed between a side face of each protrusion and a corresponding side wall portion of each groove has a central angle which is equal to or smaller than a central angle of a distance between each protrusion and the end of a corresponding vibration proof member.

11. An outer ring for a vibration proof homokinetic joint as claimed in claim 8, wherein said outer casing has both ends thereof open and has its inner peripheral surface opposite to said vibration proof members formed as a tapered surface so that said outer casing will have an inner diameter increasing gradually toward a bottom of the joint relative to the axis of rotation.

12. An outer ring for a vibration proof homokinetic joint as claimed in claim 8, wherein the protrusions are provided only near one end of said outer casing.

13. An outer ring for a vibration proof homokinetic joint as claimed in claim 12, further comprising:

a resilient member in the form of a thin film is provided between a bottom inner surface of said outer casing and a bottom outer surface of said inner casing to separate them relative to the axis of rotation.

14. An outer ring for a vibration proof homokinetic joint as claimed in claim 8, wherein said protrusions are provided at both ends of said outer casing and said outer casing is formed with a radial hole defined between the protrusions for injecting a material for said vibration proof members.

15. A casing for an outer ring used in a vibration proof homokinetic joint, said outer ring comprising:

an outer casing formed with protrusions having side faces and angularly spaced along an inner peripheral surface thereof;

an inner casing having defined therein grooves having side wall portions and angularly spaced along an outer peripheral surface thereof so as to receive the protrusions of said outer casing therebetween with predetermined gaps formed between a side face of protrusions adjacent to side wall portions of the grooves, the grooves being defined to extend along an axis of rotation of the joint; and a plurality of vibration proof members made of an elastic material and disposed between said outer casing and said inner casing, each of said vibration proof members being located between the adjacent protrusions and mounted between the inner peripheral surface of said outer casing and the outer peripheral surface of said inner casing.

* * * * *